United States Patent
Schneider et al.

(10) Patent No.: US 9,309,964 B2
(45) Date of Patent: Apr. 12, 2016

(54) METHOD FOR CARRYING OUT A GEAR SHIFTING OPERATION IN AUTOMATED TRANSMISSIONS

(75) Inventors: Florian Schneider, Lindenberg (DE); Mario Steinborn, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 698 days.

(21) Appl. No.: 13/695,309

(22) PCT Filed: Apr. 1, 2011

(86) PCT No.: PCT/EP2011/055090
§ 371 (c)(1),
(2), (4) Date: Oct. 30, 2012

(87) PCT Pub. No.: WO2011/138099
PCT Pub. Date: Nov. 10, 2011

(65) Prior Publication Data
US 2013/0053216 A1 Feb. 28, 2013

(30) Foreign Application Priority Data

May 6, 2010 (DE) .......................... 10 2010 028 670

(51) Int. Cl.
*F16H 61/02* (2006.01)
*F16H 61/04* (2006.01)
(Continued)

(52) U.S. Cl.
CPC ........ *F16H 61/0403* (2013.01); *F16H 61/0246* (2013.01); *F16H 2059/088* (2013.01); *F16H 2061/1232* (2013.01); *F16H 2312/09* (2013.01); *Y10T 477/688* (2015.01)

(58) Field of Classification Search
CPC ............ F16H 61/0246; F16H 61/0403; F16H 2061/0407; F16H 2061/0411; F16H 2061/1236; F16H 2312/09
See application file for complete search history.

(56) References Cited

U.S. PATENT DOCUMENTS

| 6,662,095 B1 | 12/2003 | Habeck |
| 8,251,867 B2 | 8/2012 | Reith et al. |

(Continued)

FOREIGN PATENT DOCUMENTS

| CN | 101466961 A | 6/2009 |
| CN | 101586642 A | 11/2009 |

(Continued)

OTHER PUBLICATIONS

German Search Report Corresponding to DE 10 2010 028 670.2.
(Continued)

*Primary Examiner* — Derek D Knight
(74) *Attorney, Agent, or Firm* — Davis & Bujold PLLC; Michael J. Bujold

(57) ABSTRACT

A method of performing a shift operation in an automatic transmission with at least one form-locking shifting transmission part of a vehicle, with which, during a shift to a target gear ($G_{ZIEL}$), a rotational speed synchronization, between the transmission input rotational speed and the output side rotational speed, is performed. When a different rotational direction is detected between the transmission input and the transmission output, the rotational speed of the transmission input is reduced to a minimum and the target gear ($G_{ZIEL}$) is only shifted when the remaining rotational speed difference, between the rotational speed of the transmission input and the rotational speed of the transmission output can be at least substantially synchronized by the form-locking shift element.

13 Claims, 1 Drawing Sheet

(51) Int. Cl.
*F16H 59/08* (2006.01)
*F16H 61/12* (2010.01)

(56) References Cited

U.S. PATENT DOCUMENTS

2009/0071274 A1* 3/2009 Bader et al. .................. 74/335
2009/0312929 A1 12/2009 Doebele et al.

FOREIGN PATENT DOCUMENTS

| CN | 101617148 A | 12/2009 |
| DE | 199 32 052 A1 | 1/2001 |
| DE | 101 24 989 A1 | 12/2002 |
| DE | 10 2006 054 516 A1 | 6/2007 |
| DE | 10 2006 030 157 A1 | 1/2008 |
| DE | 10 2007 007 257 A1 | 8/2008 |
| EP | 2 058 558 A1 | 5/2009 |
| GB | 2 377 475 A | 1/2003 |

OTHER PUBLICATIONS

International Search Report Corresponding to PCT/EP2011/055090.
Written Opinion Corresponding to PCT/EP2011/055090.
Chinese Office Action issued in corresponding Chinese Application No. 201180022790.8 mailed on May 21, 2014.

* cited by examiner

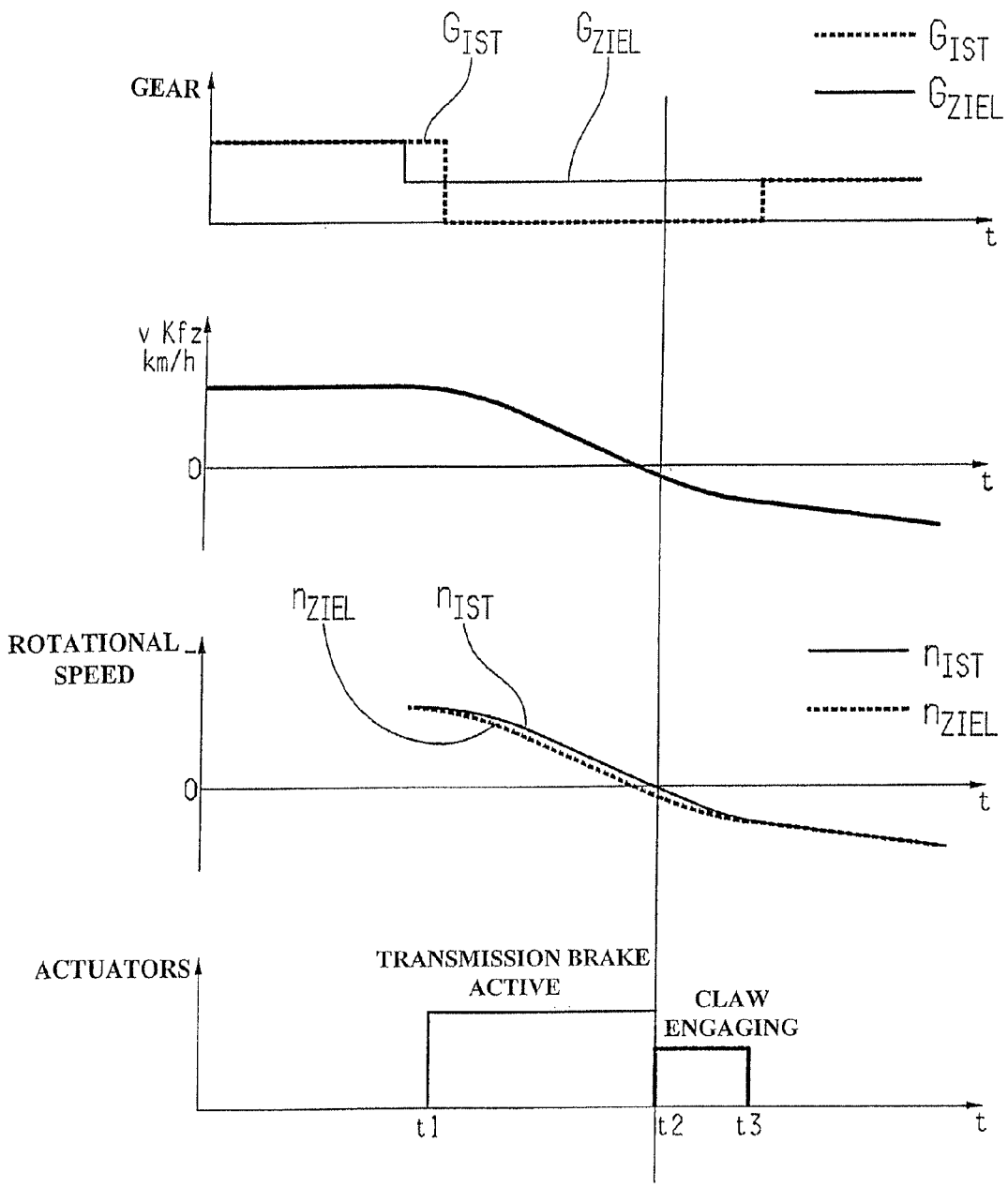

METHOD FOR CARRYING OUT A GEAR SHIFTING OPERATION IN AUTOMATED TRANSMISSIONS

This application is a National Stage completion of PCT/EP2011/055090 filed Apr. 1, 2011, which claims priority from German patent application serial no. 10 2010 028 670.2 filed May 6, 2010.

FIELD OF THE INVENTION

The present invention relates to a method for performing a shift operation in an automatic transmission with an automated, at least form-locking shift transmission.

BACKGROUND OF THE INVENTION

From automotive technology, it is known with automatic transmissions in which at least one transmission part is designed as a so-called constant mesh transmission that during a gear shift operation a synchronization procedure is produced using an actuator. If the vehicle is located on a significant incline or has a high rolling resistance, for instance during off-road use, the vehicle can come to a standstill or even roll backwards during a shift, due to the interruption of tractive force. In such situations it is necessary to slow down the transmission input during the synchronization procedure, and to subsequently accelerate the transmission corresponding to the vehicle speed and the drive train transmission ratio, counter to the direction of rotation of the internal combustion engine. For example, it is known from the document DE 10 2007 007 257 A1 that an electric machine is used to be able to perform the synchronization procedure despite such difficult shifting procedures in the shift transmission. However, an electric machine is essential for this purpose, such that these measures cannot be applied in transmissions without the electric machine. In addition, the use of the electric machine increases the consumption disadvantageously.

With known automatic transmissions without electric machines, it is assumed that the target rotational speed is set independent of the direction of rotation. This can lead to undesired shifting noises or even to the deflection of the shifting claw with the above named shift procedures. This negatively impacts the shifting performance.

SUMMARY OF THE INVENTION

The present invention proposes a method of the initially named type in which the synchronization procedure is performed without the use of an additional electric machine even in the case of different directions of rotation between the transmission input and output.

Accordingly, a method is proposed for shifting a target gear with an automatic transmission having at least one form-locking shift transmission part of a vehicle, wherein other transmission parts can also be provided. With the method for shifting the target gear, rotational speed synchronization is performed between the transmission input rotational speed and the output side rotational speed, if a different direction of rotation is detected between the transmission input and the output, wherein the transmission input rotational speed is reduced to a minimum, and wherein the target gear is shifted only when the remaining rotational speed difference between the transmission input rotational speed and the output-side rotational speed can be at least substantially synchronized or equalized by the form-locking shift element of the transmission.

In the scope of the present method according to the invention, the direction of rotation is determined before or during a shift procedure, so that a possible change of travel direction of the vehicle can be detected during the shift procedure. In this manner it can be determined that the travel direction does not coincide with the gear to be shifted. In such a situation, the transmission input speed is reduced to a minimum using the method according to the invention. Because with a conventional transmission without an electric machine no rotational speed can be set with a direction of rotation counter to the internal combustion engine, the method subsequently begins to engage the target gear although the actual rotational speed does not correspond to the target rotational speed. However, this depends on whether the form-locking shift element on its own is mechanically capable of reducing the rotational speed difference.

In the scope of the proposed method, the transmission input rotational speed can be reduced preferably to the value zero, within the scope of the synchronization procedure according to the invention, for example using an existing transmission brake or also using the internal combustion engine of the vehicle. It is also possible, for example to reduce the transmission input rotational speed using the startup clutch of the vehicle.

In order to decide whether the shift element is mechanically capable of reducing the difference of the rotational speed, it is expedient within the scope of the next further development of the invention to at least determine a limit value up to which it is still possible to perform a shift. For this purpose, the rotational speed difference with which a shift is still expedient is determined between the target rotational speed calculated from the output drive and the actual rotational speed, to ensure a shift within an acceptable shift time. A rotational speed gradient, for example the progression of the transmission input rotational speed, can also be considered as a limit value. If the actual rotational speed gradient exceeds a value which is greater or near the rotational speed gradient of the synchronization function of the shifting claw, this is an indication for possible shift problems so that the target gear is then not shifted. If at least one of the two named limit values is reached, the transmission shift should be ended and the transmission should remain in neutral.

If the shift procedure is discontinued, it is expedient to inform the driver about the termination, for example using an appropriate display or an audible warning signal so that the driver can react suitably. Preferably upon the detection of such a situation, a warning message can also be transmitted ahead of time to the driver so that the driver can prepare himself early for the possibility of a shift to neutral.

The proposed method can preferably be used with automatic transmissions with at least one claw transmission part, for example for commercial vehicles or a bus. Other possible uses are also feasible.

BRIEF DESCRIPTION OF THE DRAWINGS

The present invention is described in more detail using the drawing. The sole FIGURE of the invention shows a representation with different graphs in which the gear progression, the vehicle speed progression, the rotational speed progressions, and the actuation progression of the actuators are shown over time, for performing the synchronization procedure. The progressions for a downshift during which the vehicle starts to recover, are shown as an example. The proposed method can however also be used with an upshift.

DETAILED DESCRIPTION OF THE PREFERRED EMBODIMENTS

In the upper graph of the FIGURE, the presently engaged gear can be seen in that an actual gear progression $G_{IST}$ is indicated with a dotted line, and a target gear $G_{ZIEL}$ progression is indicated with a solid line. From the two progressions it can be seen that at time $t_1$, the transmission is shifted into neutral and only at time $t_3$, after the completion of the synchronization, is the target gear shifted.

It can be seen from the progressions of the vehicle speed $V_{KFZ}$ and the progression of the actual rotational speed $n_{IST}$ and the target rotational speed $n_{ZIEL}$ at the transmission input in the center diagram that a reversal of the vehicle direction occurs during the shift procedure. This is also indicated by the progression of the rotational speed.

The lower graph in the FIGURE shows the activities of the transmission brake at time $t_1$ and at time $t_2$, in order to reduce the transmission input rotational speed to the value of zero. From the time $t_2$ until the time $t_3$, the claw shifting element is activated for equalizing the remaining rotational speed difference, in order to, at time $t_3$, engage the target gear for the completion of the shift procedure.

The downshift represented in FIGURE begins therefore with the disengagement of the gear at time $t_1$. As soon as the transmission is in neutral, the transmission brake is activated in order to set the target rotational speed $n_{ZIEL}$. The target rotational speed $n_{ZIEL}$ results from the output rotational speed and thus, the vehicle speed $V_{KFZ}$ and the transmission ratio of the target gear $G_{ZIEL}$. From time $t_2$, at which the input rotational speed corresponds to the value zero, further control of the transmission brake is no longer necessary. The remaining rotational speed difference between the actual rotational speed $n_{IST}$ and the target rotational speed $n_{ZIEL}$ is reduced now by the shifting claw in order to complete the synchronization procedure. In this manner using the method according to the invention, a synchronization procedure is implemented with an automated constant mesh transmission with a change of travel direction without an additional electric machine.

REFERENCE CHARACTERS $n_{IST}$ actual rotational speed at the transmission input
$n_{ZIEL}$ target rotational speed at the transmission input
$G_{IST}$ actual gear
$G_{ZIEL}$ target gear
$t_1$ time at the start of the synchronization procedure
$t_2$ time at reversal of rotational speed
$t_3$ time at the end of the synchronization procedure

The invention claimed is:

1. A method of performing a shift procedure in an automatic transmission with at least one form-locking shift transmission part of a vehicle, with which, a rotational speed synchronization, between a transmission input rotational speed and a transmission output rotational speed, is performed during a shift to a target gear ($G_{ZIEL}$), the method comprising the steps of:
    detecting a direction of rotation of both the transmission input and the transmission output, and if a different direction of rotation is detected between the transmission input and the transmission output, reducing a rotational speed of the transmission input to a minimum; and
    only shifting the target gear ($G_{ZIEL}$) when a remaining rotational speed difference, between the rotational speed of the transmission input and the rotational speed of the transmission output is at least substantially synchronizable by the form-locking shift transmission part.

2. The method according to claim 1, further comprising the step of reducing the rotational speed of the transmission input to a value of substantially zero using either of a transmission brake or an internal combustion engine of the vehicle.

3. The method according to claim 1, further comprising the step of specifying a limit value for the remaining rotational speed difference, up to which a shift is performed.

4. The method according to claim 3, further comprising the step of, upon exceeding the specified limit value, discontinuing the shift procedure, shifting the transmission into a neutral position and maintaining the neutral position in the transmission.

5. The method according to claim 4, further comprising the step of the signaling a discontinuation of the shift procedure to a driver upon exceeding the specified limit value.

6. The method according to claim 1, further comprising the step of performing the method with either a commercial vehicle or a bus with the automatic transmission having the at least one form-locking shift transmission part, and the form-locking shift transmission part being at least one claw transmission part.

7. A method of performing a shift procedure in an automatic transmission with at least one form-locking shift transmission part of a vehicle, with which, a rotational speed synchronization, between a transmission input rotational speed and a transmission output rotational speed, is performed during a shift to a target gear ($G_{ZIEL}$), the method comprising the steps of:
    if a different direction of rotation is detected between the transmission input and the transmission output, reducing a rotational speed of the transmission input to a minimum;
    only shifting the target gear ($G_{ZIEL}$) when a remaining rotational speed difference, between the rotational speed of the transmission input and the rotational speed of the transmission output is at least substantially synchronizable by the form-locking shift transmission part;
    specifying a limit value for the remaining rotational speed difference, up to which a shift is performed; and
    using a rotational speed gradient for a progression of the rotational speed of the transmission input as the limit value.

8. A method of shifting from an actual gear to a target gear in an automatic transmission of a vehicle with at least one transmission form-locking shift element, the automatic transmission having a transmission input and a transmission output, the method comprising the steps of:
    detecting a direction of rotation of both the transmission input and the transmission output, and thereby detecting a rotational direction difference between the transmission input and the transmission output;
    reducing a rotational speed of the transmission input to a minimum valve;
    at least substantially synchronizing a remaining rotational speed difference, between the rotational speed of the transmission input and the rotational speed of the transmission output with the form-locking shift element;
    only shifting to the target gear when the remaining rotational speed difference, between the rotational speed of the transmission input and the rotational speed of the transmission output is at least substantially synchronized by the form-locking shift element; and
    reducing the rotational speed of the transmission input to a value of zero using either a transmission brake or an internal combustion engine.

9. The method according to claim 8, further comprising the step of specifying a limit value for the remaining rotational speed difference, up to which the shift to the target gear is performed.

10. The method according to claim 9, further comprising the step of using a rotational speed gradient for a progression of the rotational speed of the transmission input as the limit value.

11. The method according to claim 9, further comprising the step of discontinuing shifting, from the actual gear to the target gear, shifting the transmission into a neutral position and maintaining the neutral position in the transmission when the specified limit value is exceeded.

12. The method according to claim 11, further comprising the step of the signaling a driver of the discontinuation of the shift from the actual gear to the target gear.

13. The method according to claim 12, further comprising the step of performing the method in one of:
   a commercial vehicle incorporating the automatic transmission having the form-locking shift transmission part, and the form-locking shift transmission part being at least one claw transmission part; and
   a bus incorporating the automatic transmission having the form-locking shift transmission part, and the form-locking shift transmission part being at least one claw transmission part.

* * * * *